United States Patent
Lu et al.

(10) Patent No.: US 8,217,982 B2
(45) Date of Patent: Jul. 10, 2012

(54) LIQUID CRYSTAL DISPLAY HAVING TWO OR MORE CAMERAS THAT CAN CAPTURE A WIDE RANGE OF VIDEO

(75) Inventors: Yue-Qin Lu, Shenzhen (CN); Tong Zhou, Shenzhen (CN)

(73) Assignees: Innocom Technology (ShenZhen) Co., Ltd., Shenzhen (CN); Chimei Innolux Corporation, Miaoli County (TW)

( * ) Notice: Subject to any disclaimer, the term of this patent is extended or adjusted under 35 U.S.C. 154(b) by 1235 days.

(21) Appl. No.: 12/004,977

(22) Filed: Dec. 21, 2007

(65) Prior Publication Data

US 2008/0150861 A1  Jun. 26, 2008

(30) Foreign Application Priority Data

Dec. 22, 2006  (CN) .......................... 2006 1 0157897

(51) Int. Cl.
 *H04N 7/14* (2006.01)
(52) U.S. Cl. ................. 348/14.07; 348/14.11
(58) Field of Classification Search ...... 348/14.01–14.1, 348/262, 333.08, 739
 See application file for complete search history.

(56) References Cited

U.S. PATENT DOCUMENTS

| | | | |
|---|---|---|---|
| 6,388,571 B1 | 5/2002 | Kirino | |
| 6,833,863 B1 | 12/2004 | Clemens | |
| 2003/0215010 A1 | 11/2003 | Kashiwa | |
| 2005/0028214 A1 | 2/2005 | Hall | |
| 2005/0270396 A1* | 12/2005 | Miyashita et al. | 348/333.01 |

FOREIGN PATENT DOCUMENTS

| | | |
|---|---|---|
| CN | 1318257 A | 10/2001 |
| CN | 1682150 A | 10/2005 |
| JP | 08-294030 | * 11/1996 |
| JP | 10-75432 A | 3/1998 |

* cited by examiner

*Primary Examiner* — Brian Ensey
(74) *Attorney, Agent, or Firm* — WPAT., P.C.; Justin King

(57) ABSTRACT

An exemplary liquid crystal display (2) includes a first camera (23) configured for capturing video from a first orientation, a second camera (24) configured for capturing video from a second orientation different from the first orientation, and a capture circuit (20) electrically connected to the first and the second cameras. The capture circuit is configured for controlling the first and the second cameras to capturing video asynchronously or simultaneously.

20 Claims, 3 Drawing Sheets

LIQUID CRYSTAL DISPLAY HAVING TWO OR MORE CAMERAS THAT CAN CAPTURE A WIDE RANGE OF VIDEO

FIELD OF THE INVENTION

The present invention relates liquid crystal displays, and more particularly to a liquid crystal display having two or more cameras for a wide range of video capture.

GENERAL BACKGROUND

A liquid crystal display has the advantages of portability, low power consumption, and low radiation, and has been widely used in various portable information products such as cell phones, notebooks, and personal digital assistants (PDAs). Nowadays, with more and more means of electronic communication available, video meetings and video chats are commonplace. Liquid crystal displays with built-in video cameras are becoming increasingly popular.

Referring to FIG. 3, a typical computer device 10 includes a liquid crystal display 11, a host 12, and a transmission line 13. The liquid crystal display 11 is connected to the host 12 via the transmission line 13. The host 12 includes a universal serial bus (USB) controller 121. The liquid crystal display 11 includes a front bezel 111, a back housing (not labeled), a camera 113, and a liquid crystal panel 112 received between the front bezel 111 and the back housing. The camera 113 is disposed in a middle of a top edge portion of the liquid crystal display 11. The front bezel 111 defines a circular opening (not labeled) in a middle of a top portion thereof, and the camera is exposed at the opening. The camera 113 is capable of capturing videos or still pictures, and transmitting the captured videos or still pictures to the USB controller 121 via the transmission line 13.

When the camera 113 is used to capture videos, the camera 113 is activated by the host 12. Then, the camera 113 begins to capture a video. A video signal is generated and transmitted to the USB controller 121, the host 12 reads and processes the video signal, and sends the video signal to the liquid crystal display 11. Thus, the liquid crystal display 11 can display the video captured by the camera 113. Similarly, the liquid crystal display 11 can display video captured by a camera 113 of another liquid crystal display 11 that is linked to the liquid crystal display 11. However, the camera 113 can only capture videos of people and objects directly in front of the liquid crystal display 11. The camera 113 cannot capture videos of people and objects that are, for example, at a rear of the liquid crystal display 11. Thus the liquid crystal display 11 has limited video capture functionality. For example, the liquid crystal display 11 is unable to provide a full range of angles for video surveillance.

What is needed, therefore, is a liquid crystal display that can overcome the above-described deficiencies.

SUMMARY

In one preferred embodiment, a liquid crystal display includes a first camera configured for capturing video from a first orientation, a second camera configured for capturing video from a second orientation different from the first orientation, and a capture circuit electrically connected to the first and the second cameras. The capture circuit is configured for controlling the first and the second cameras to capturing video asynchronously or simultaneously.

Other novel features and advantages will become more apparent from the following detailed description when taken in conjunction with the accompanying drawings.

DETAILED DESCRIPTION OF PREFERRED EMBODIMENTS

Figure 1:
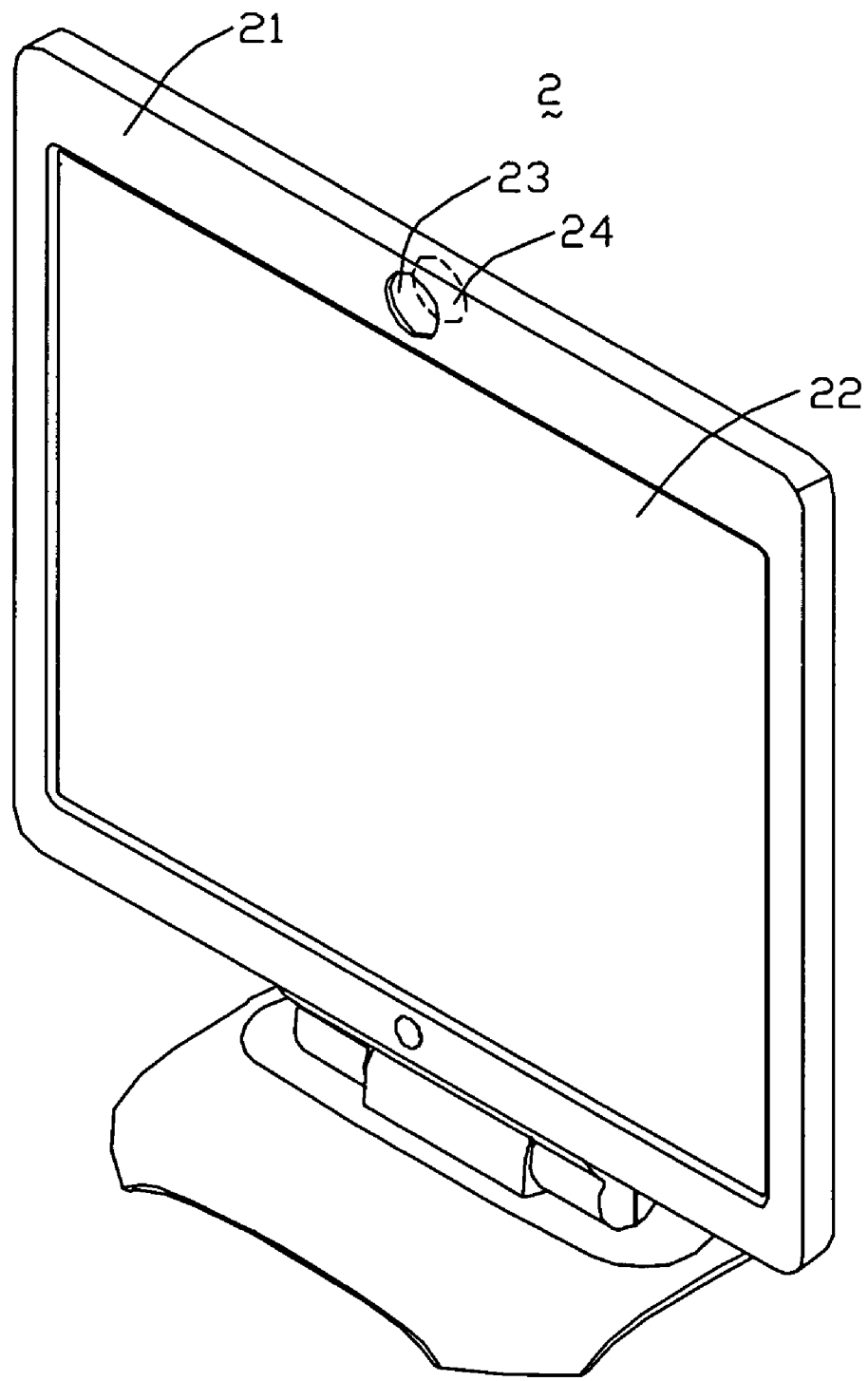
FIG. 1 is an isometric view of a liquid crystal display according to an exemplary embodiment of the present invention.

Referring to FIG. 1, an isometric view of a liquid crystal display 2 according to an exemplary embodiment of the present invention is shown. The liquid crystal display 2 includes a front bezel 21, a back housing (not labeled), a liquid crystal panel 22, a first camera 23, and a second camera 24. The front bezel 21 and the back housing cooperatively define an accommodating space for receiving the liquid crystal panel 22. The first camera 23 is disposed at a middle of a top portion of the front bezel 21. The front bezel 21 defines a circular opening, and the first camera 23 is exposed at the opening. The second camera 24 is disposed at a middle of a top edge portion of the back housing. The back housing defines a circular opening, and the second camera 24 is exposed at the opening. Thus, the first camera 23 and the second camera 24 are symmetrically disposed.

Figure 2:
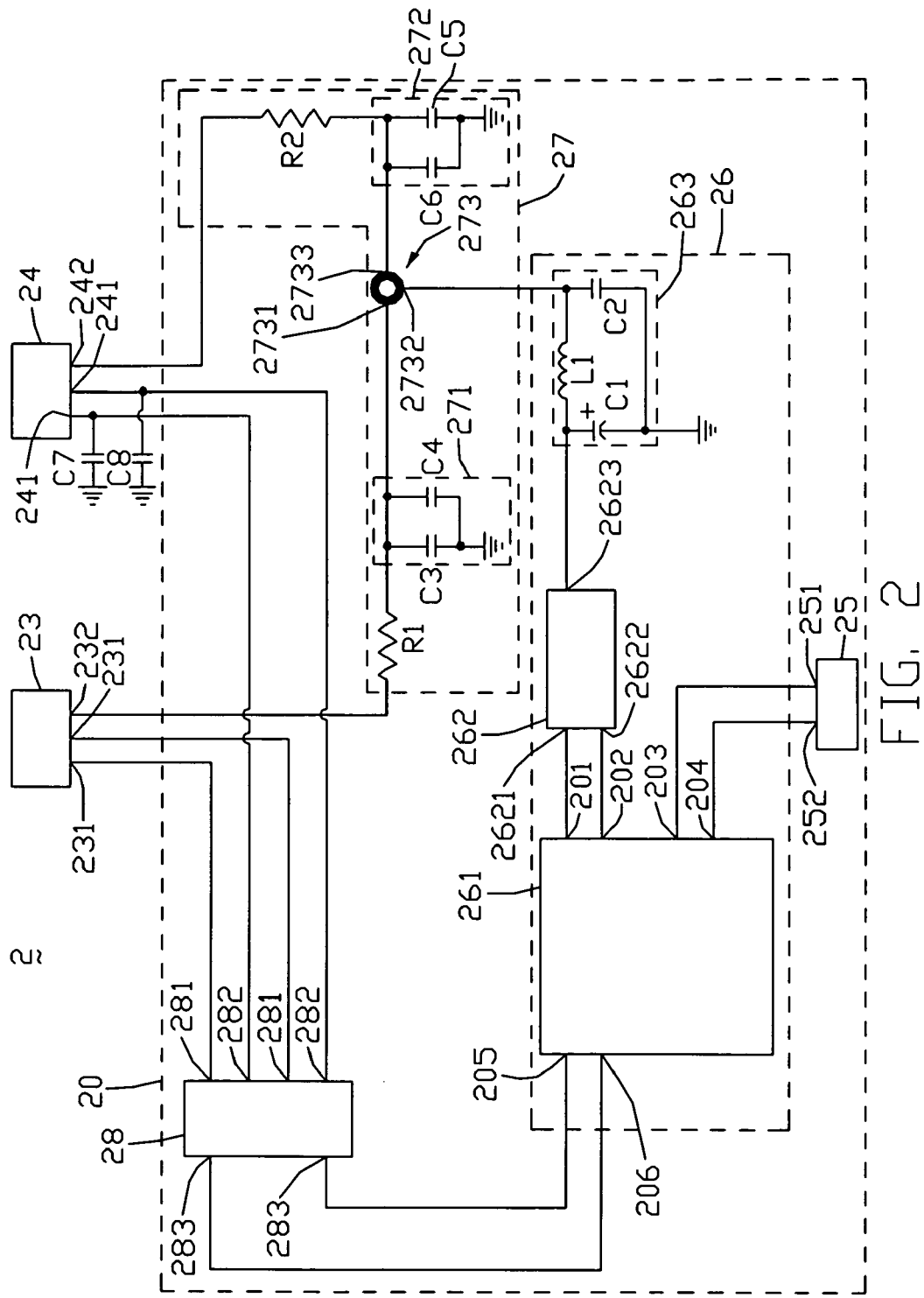
FIG. 2 is essentially a circuit diagram relating to video capture function of the liquid crystal display of FIG. 1.
Figure 3:
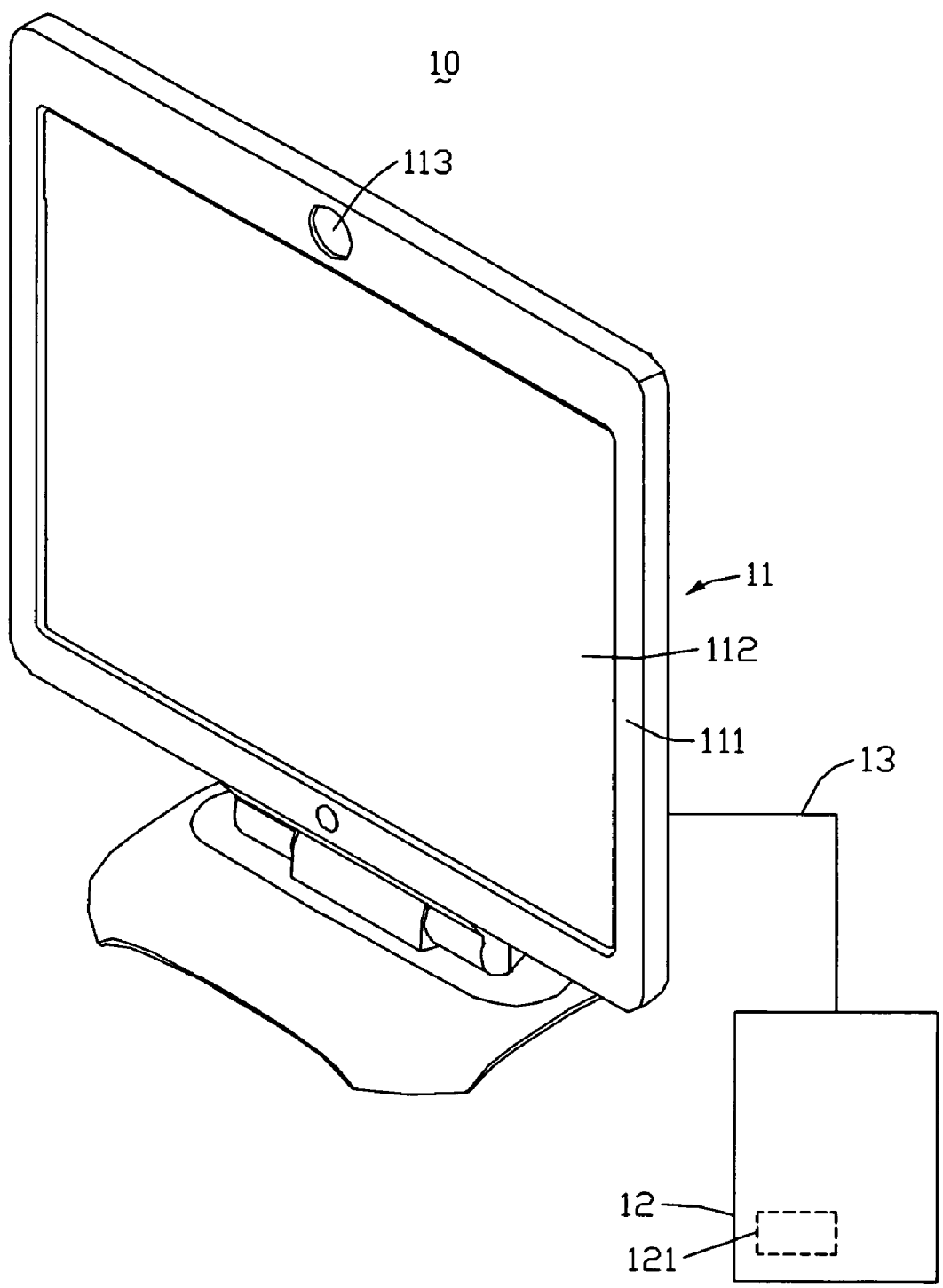
FIG. 3 is an isometric view of a conventional liquid crystal display, and schematically showing connection of the liquid crystal display to a host.

Referring to FIG. 2, a circuit diagram relating to video capture function of the liquid crystal display 2 is shown. The liquid crystal display 2 includes a capturing circuit 20. The capturing circuit 20 includes a micro processing unit (MCU) 25, a USB unit 26, a switching circuit 27, and a difference circuit 28. The MCU 25 is configured for sending an instruction from a user to activate the USB unit 26. The USB unit 26 provides a power signal to the switching circuit 27 after being activated. The switching circuit 27 is configured for making the first camera 23 and the second camera 24 work according to the power signal. Each of the first and second cameras 23, 24 is configured for capturing a video and sending a video signal to the USB unit 26 via the difference circuit 28. The USB unit 26 performs modulation of the video signal, and transmits the modulated video signal to the MCU 25.

The MCU 25 includes a serial data port 251 and a serial clock port 252. The serial data port 251 is configured for transmitting data between the USB unit 26 and the MCU 25. The serial clock port 252 is configured for controlling the transmission of the data between the USB unit 26 and the MCU 25.

The USB unit 26 includes a USB controller 261, a USB driver 262, and a first filter circuit 263. The USB controller 261 includes a first pad 201, a second pad 202, a third pad 203, a fourth pad 204, a fifth pad 205, and a sixth pad 206. The USB driver 262 includes a first receiving pad 2621, a second receiving pad 2622, and an output pad 2623. The first filter circuit 263 includes a first capacitor C1, a second capacitor C2, and an inductor L1. The first and the second pads 201, 202 are connected to the first and second receiving pads 2621, 2622 respectively. The third and fourth pads 203, 204 are connected to the serial data port 251 and the serial clock port 252 respectively. The output pad 2623 is connected to the switching circuit 27 via the inductor L1, and is further connected to ground via a positive electrode and a negative electrode of the first capacitor C1. The output pad 2623 is further connected to ground via the inductor L1 and the second capacitor C2. The first filter circuit 263 is configured for smoothing signals from the USB driver 262. The USB controller 261 is a controlling integrated circuit, and can for example be an SMSC2504 model. The USB driver 262 is a driving integrated circuit, and can for example be a G556 model.

The switching circuit 27 includes a second filter circuit 271, a third filter circuit 272, a first current-limiting resistor R1, a second current-limiting resistor R2, and a tripolar switch 273. The second filter circuit 271 includes a third capacitor C3 and a fourth capacitor C4. The third filter circuit 272 includes a fifth capacitor C5 and a sixth capacitor C6. The switch 273 includes a first end 2731, a second end 2732, and a third end 2733. The third capacitor C3 and the fourth capacitor C4 are connected in parallel between the first end 2731 and ground. The fifth capacitor C5 and the sixth capacitor C6 are connected in parallel between the third end 2733 and ground. The second end 2732 is connected to a node between the inductor L1 and the second capacitor C2. The switch 273 is disposed at the front bezel 21 or the back housing. The second end 2732 can be manually switched to connect to the first end 2731, or connect to the third end 2733, or connect to the first and third ends 2731, 2733 simultaneously. The switching circuit 27 is configured for starting at least one of the first and second cameras 23, 24.

The first camera 23 includes a pair of first differential signal output terminals 231, and a first working signal input terminal 232. The second camera 24 includes a pair of second differential signal output terminals 241, a second working signal input terminal 242, a first delay capacitor C7, and a second delay capacitor C8. The difference circuit 28 includes a pair of first differential signal input terminals 281, a pair of second differential signal input terminals 282, and a pair of third differential signal output terminals 283. The first differential signal input terminals 281 are respectively connected to the first differential signal output terminals 231 of the first camera 23. The second differential signal input terminals 282 are respectively connected to the second differential signal output terminals 241 of the second camera 24. The first and second delay capacitors C7, C8 are respectively connected between the second differential signal output terminals 241 and ground. The third differential signal output terminals 283 are respectively connected to the fifth pad 205 and the sixth pad 206 of the USB controller 261. The first working signal input terminal 232 is connected to the first end 2371 via the first current-limiting resistor R1. The second working signal input terminal 242 is connected to the third end 2373 via the second current-limiting resistor R2. The first camera 23 is configured for capturing a video, and providing a plurality of first differential video signals corresponding to the captured video. The second camera 24 is configured for capturing a video, and providing a plurality of second differential video signals corresponding to the captured video. The first differential signal output terminals 261 are configured for outputting the first differential video signals. The second differential signal output terminals 241 are configured for outputting the second differential video signals. The first delay capacitor C7 and the second delay capacitor C8 are configured for delaying outputting of the second differential video signals. The second filter circuit 271 is configured for providing a first working signal to the first camera 23. The third filter circuit 272 is configured for providing a second working signal to the second camera 24. The difference circuit 28 is configured for receiving the first and second differential video signals from the first camera 23 and the second camera 24, and transmitting the first and second video signals to the fifth pad 205 and the sixth pad 206 respectively.

A working principle of the liquid crystal display 2 is as follows. The MCU 25 applies a user's instruction to the USB controller 261 so as to start the USB controller 261. The USB controller 261 then applies a flag signal to the USB driver 262 so as to start the USB driver 262. The USB driver 262 applies a power signal to the second end 2732 of the switch 273.

When the second end 2732 is connected to the first end 2731, the power signal is accordingly applied to the second filter circuit 271. The second filter circuit 271 applies a first working signal to the first camera 23, and thus the first camera 23 starts to capture a video of people or objects in front of the liquid crystal display 2. The first camera 23 then applies the first differential video signals to the difference circuit 28. The difference circuit 28 transmits the first differential video signals to the USB controller 261. The USB controller 261 transforms the first differential video signals into corresponding first serial video signals, and transmits the first serial video signals to the MCU 25. The MCU 25 transmits the first serial video signals to an exterior host for signal processing.

When the second end 2732 is connected to the third end 2733, the power signal is accordingly applied to the third filter circuit 272. The third filter circuit 272 applies a working signal to the second camera 24, and thus the second camera 24 starts to capture a video of people or objects at a rear of the liquid crystal display 2. The second camera 24 then applies corresponding second differential video signals to the difference circuit 28. The difference circuit 28 transmits the second differential video signals to the USB controller 261. The USB controller 261 transforms the second differential video signals into corresponding second serial video signals, and transmits the second serial video signals to the MCU 25. The MCU 25 transmits the second serial video signals to the exterior host for signal processing.

When the second end 2732 is connected to both the first end 2731 and the third end 2733 simultaneously, the first camera 23 and the second camera 24 both capture videos. The first differential video signals and the second differential video signals are applied to the difference circuit 28. Because the second differential video signals are delayed by the first and second delay capacitors C7, C8, the second differential video signals are applied to the difference circuit 28 with a certain delay relative to the first differential video signals. The difference circuit 28 then outputs the first and second differential video signals to the USB controller 261. The USB controller 261 transforms the first and second differential video signals into corresponding first and second serial video signals, and transmits the first and second serial video signals to the MCU 25. The MCU 25 transmits the serial video signals to the exterior host for signal processing. A desired period of the delay can be predetermined by selecting appropriate capacitances for the first and second delay capacitors R7, R8.

In summary, the liquid crystal display 2 includes the first and second cameras 23, 24 disposed respectively at the front bezel 21 and the back housing. The liquid crystal display 2 can capture videos of people or objects that are in front of the liquid crystal panel 22 ("first videos") and at a rear of the liquid crystal panel 22 ("second videos"). The capturing can be of the first videos only, the second videos only, or both the first videos and the second videos, according to user demand. When both the first and second videos are captured, a selected one of the first differential video signals and the second differential video signals can be delayed when these signals are subsequently processed and utilized, according to user demand. The liquid crystal display 2 can transmit serial video signals corresponding to the captured videos to the MCU 25. Thus the process of video capture is convenient, because the process does not need a USB circuit of an exterior host. The first, second, and third filter circuits 263, 271, 272 can prevent signal ripple. Thus the liquid crystal display 2 can stably and reliably display corresponding video images, and the quality of displayed images is good. Similarly, the liquid crystal display 2 can display video captured by cameras 23, 24 of another liquid crystal display 2 that is linked to the liquid crystal display 2.

In alternative embodiments, the liquid crystal display 2 can include three or more cameras. In any of the above-described embodiments, the cameras can be disposed at any of various desired positions in the liquid crystal panel 22 for appropriate video capture. The cameras can have various orientations in the liquid crystal panel 22 for appropriate video capture.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display comprising:
  a first camera positioned in a first orientation in the liquid crystal display, the first camera configured for capturing video from the first orientation;
  a second camera positioned in a second orientation in the liquid crystal display, the second orientation being different from the first orientation, the second camera configured for capturing video from the second orientation; and
  a capture circuit electrically connected to the first and second cameras, the capture circuit configured for controlling at least one of the first and second cameras to capture video according to user instruction;
  wherein the capture circuit comprises a universal serial bus (USB) unit and a switching circuit connected to the USB unit, the USB unit being configured for providing a power signal to the switching circuit, the switch circuit being configured for selectively starting one of the first camera and the second camera or starting both of the first and second cameras.

2. The liquid crystal display in claim 1, wherein the first camera and the second camera are capable of providing a plurality of first differential video signals and a plurality of second differential video signals respectively according to the captured video.

3. The liquid crystal display in claim 2, wherein the capture circuit is further configured for delaying a selected one of the plurality of first differential video signals and the plurality of second differential video signals according to user instruction.

4. The liquid crystal display in claim 2, further comprising a difference circuit connected to the first camera, the second camera, and the USB unit, the difference circuit being configured for receiving the first and second differential video signals and transmitting video signals corresponding to the first and second differential video signals to the USB unit.

5. The liquid crystal display in claim 4, wherein the USB unit comprises a USB controller, a USB driver connected to the USB controller, and a first filter circuit, the USB controller being configured for receiving video signals from the difference circuit and applying corresponding serial video signals to an exterior circuit, the first filter circuit being configured for smoothing the power signal and transmitting the power signal to the switching circuit.

6. The liquid crystal display in claim 5, wherein the USB controller is capable of sending a flag signal to the USB driver in response to a user's instruction.

7. The liquid crystal display in claim 6, wherein the USB driver is configured for applying a power signal to the switching circuit according to the flag signal.

8. The liquid crystal display in claim 7, wherein the switching circuit comprises a second filter circuit, a third filter circuit, and a switch, the second filter circuit being configured for providing a first working signal to the first camera according to the power signal, the third filter circuit being configured for providing a second working signal to the second camera according to the power signal, the switch being configured for switching situations among providing the power signal to the second filter circuit, providing the power signal to the third filter circuit, and providing the power signal both to the second and the third filter circuits.

9. The liquid crystal display in claim 5, wherein the first camera comprises a pair of first differential video signal output terminals and a first working signal input terminal, the second camera comprising a pair of second differential video signal output terminals and a second working signal input terminal, and the difference circuit comprising a pair of first differential signal input terminals connected to the first differential video output terminals respectively, a pair of second differential signal input terminals connected to the second differential signal output terminals respectively.

10. The liquid crystal display in claim 9, wherein the difference circuit further comprises a pair of third differential signal output terminals, the USB controller comprising a first pad, a second pad, a third pad, a fourth pad, a fifth pad, and a sixth pad, the first and the second pads being connected to the USB driver for outputting the flag signal, the third and the fourth pads being connected to an exterior circuit for receiving user instruction from the exterior circuit and outputting serial video signals to the exterior circuit.

11. The liquid crystal display in claim 10, wherein the first filter circuit comprises a first capacitor, a second capacitor and an inductor, the USB driver being connected to the switching circuit via the inductor, and connected to ground via the first capacitor, the USB driver further being connected to ground via the inductor and the second capacitor.

12. The liquid crystal display in claim 11, wherein the switching circuit further comprises a first current-limiting resistor and a second current-limiting resistor, the switch comprising a first end, a second end and a third end, the second filter circuit comprising a third capacitor and a fourth capacitor both connected between the first end and ground, the third filter circuit comprising a fifth capacitor and a sixth capacitor both connected between the third end and ground, the first working signal input terminal being connected to the second end via the first current-limiting resistor, the second working signal input terminal being connected to the third end via the second current-limiting resistor, the second end being connected to the first filter circuit.

13. The liquid crystal display in claim 9, wherein the second camera further comprises a first delay capacitor the and a second delay capacitor connected between the second differential signal output terminals respectively, the first and the second delay capacitors being configured for delaying the second differential video signals provided by the second differential signal output terminals.

14. A liquid crystal display comprising:
- a first camera positioned in a first orientation in the liquid crystal display, the first camera configured for capturing first video from the first orientation;
- a second camera positioned in a second orientation in the liquid crystal display, the second camera configured for capturing second video from the second orientation;
- a power supply unit configured for providing a power signal; and
- a switching circuit configured for transmit the power signal to at least one of the first camera and the second camera, so as to selectively activate one of the first camera and the second camera or both of the first and second cameras.

15. The liquid crystal display in claim 14, wherein the power supply unit is a universal serial bus (USB) unit.

16. The liquid crystal display in claim 14, wherein the first camera is further configured for converting the first video captured from the first orientation to a plurality of first differential video signals, and the second camera is further configured for converting the second video captured from the second orientation to a plurality of second differential video signals.

17. The liquid crystal display in claim 16, further comprising a difference circuit configured for receiving the first differential video signals and the second differential video signals, and transmitting the first differential video signals and the second differential video signals to the USB unit.

18. The liquid crystal display in claim 17, further comprising a delay circuit connected to the second camera, wherein the delay circuit is configured to delay the second differential video signals for a predetermined time period before the second differential video signals being outputting to the difference circuit.

19. A liquid crystal display comprising:
- a first camera for capturing first video from a first orientation;
- a second camera for capturing second video from a second orientation; and
- a capture circuit electrically connected to the first and second cameras, the capture circuit comprising a switch circuit for selectively transmitting a power signal to one of the first camera and the second camera or to both of the first and second cameras.

20. The liquid crystal display in claim 19, wherein the power signal is provided by a universal serial bus (USB) unit.

* * * * *